US012770041B2

(12) United States Patent
Jorgensen

(10) Patent No.: US 12,770,041 B2
(45) Date of Patent: Oct. 20, 2026

(54) AUTONOMOUS CONTROL USING HIERARCHICAL ENSEMBLES OF AUTONOMOUS DECISION SYSTEMS

(71) Applicant: University of South Florida, Tampa, FL (US)

(72) Inventor: Peter Joseph Jorgensen, Tampa, FL (US)

(73) Assignee: University of South Florida, Tampa, FL (US)

( * ) Notice: Subject to any disclaimer, the term of this patent is extended or adjusted under 35 U.S.C. 154(b) by 744 days.

(21) Appl. No.: 18/307,995

(22) Filed: Apr. 27, 2023

(65) Prior Publication Data

US 2024/0078455 A1 Mar. 7, 2024

Related U.S. Application Data

(60) Provisional application No. 63/364,042, filed on May 3, 2022.

(51) Int. Cl.
*G06N 7/04* (2006.01)
*G06N 5/043* (2023.01)

(52) U.S. Cl.
CPC ............. *G06N 7/046* (2013.01); *G06N 5/043* (2013.01)

(58) Field of Classification Search
CPC ........ G06N 7/046; G06N 5/043; G06N 3/045; G06N 5/048
See application file for complete search history.

(56) References Cited

U.S. PATENT DOCUMENTS

| | | | | |
|---|---|---|---|---|
| 6,633,826 | B1 * | 10/2003 | Schmidt | G01D 3/022 702/89 |
| 2019/0361454 | A1 * | 11/2019 | Zeng | G05D 1/0274 |
| 2020/0065992 | A1 * | 2/2020 | Sung | G06V 10/774 |
| 2020/0142406 | A1 * | 5/2020 | Srini | G01S 17/931 |
| 2020/0279167 | A1 * | 9/2020 | David | G06N 3/086 |
| 2021/0142225 | A1 * | 5/2021 | Odinaev | B25J 9/161 |

(Continued)

OTHER PUBLICATIONS

Wu et al., "The Ensemble Approach to Forecasting: A Review and Synthesis," Jan. 5, 2022, https://ses.library.usyd.edu.au/bitstream/handle/2123/27301/EnsembleForecasting_SynthesisPaper.pdf.*

(Continued)

*Primary Examiner* — Ryan Barrett
(74) *Attorney, Agent, or Firm* — Meunier Carlin & Curfman LLC

(57) ABSTRACT

A Hierarchical Ensembles of Autonomous Decision Systems (HEADS) system with a recursive ensemble weighting update is proposed. The system is built on fuzzy logic leading to an understandable and tractable logic design that leverages subject matter experts to design system operations. The hierarchical structure enables multi-layered logic for granular control and decisions incorporating inferred information. The control output from each ensemble is a mixture from independently trained fuzzy systems processed through a gating network. The gating network weights are updated recursively. Each expert uses a subset of the input space to minimize per-expert complexity and support ensemble robustness under uncertain or evolving state realizations and operating environments. Finally, autonomy based on fuzzy systems offers the potential for increased human comprehension of an agent's status and decision logic.

16 Claims, 9 Drawing Sheets

(56) References Cited

U.S. PATENT DOCUMENTS

| | | | | |
|---|---|---|---|---|
| 2022/0012564 | A1* | 1/2022 | Zjajo | G06N 3/049 |
| 2022/0019911 | A1* | 1/2022 | Zhou | G06N 20/00 |
| 2022/0260989 | A1* | 8/2022 | Lepird | G05D 1/227 |
| 2022/0318684 | A1* | 10/2022 | Allahdadian | G06N 3/0495 |
| 2023/0041279 | A1* | 2/2023 | Raichelgauz | G06N 20/20 |

OTHER PUBLICATIONS

Uluat, "A Fuzzy Logic Based Ensemble Adaptive Tile Prefetching," Aug. 2014, https://etd.lib.metu.edu.tr/upload/12617805/index.pdf.*

Abdullah, et al., "Hierarchical Attention Approach in Multimodal Emotion Recognition for Human Robot Interaction", 2021 36th International Technical Conference on Circuits/Systems, Computers and Communications, 2021, pp. 1-4, 2021.

Abramson, Norman, "Development of the Alohanet", IEEE Transactions on Information Theory, vol. 31, No. 2, pp. 119-123, Mar. 1985.

Ahirrao, et al., "Phrase Composing Tool using Natural Language Processing", 2021 International Conference on Intelligent Technologies (CONIT), Hubli, India, 2021, pp. 1-4, 2021.

Aja-Fernández, et al., "Matrix Modeling of Hierarchical Fuzzy Systems", IEEE Transactions on Fuzzy Systems, vol. 16, No. 3, pp. 585-599, Jun. 2008.

Alaluf, et al., "Paving The Way To Daytime Optical Feeder Links Based On LGS Assisted Adaptive Optics", International Conference on Space Optics—ICSO 2020, vol. 11852, pp. 2438-2444, Jun. 11, 2021.

Alonso, et al., "HILK: A New Methodology For Designing Highly Interpretable Linguistic Knowledge Bases Using The Fuzzy Logic Formalism", International Journal of Intelligent Systems, vol. 23, pp. 761-794, May 28, 2008.

Alonso, et al., "Looking For A Good Fuzzy System Interpretability Index: An Experimental Approach", International Journal of Approximate Reasoning, vol. 51, Issue 1, pp. 115-134, Oct. 6, 2009.

Al-Tashi, et al., "Hybrid Swarm Intelligence Algorithms with Ensemble Machine Learning for Medical Diagnosis", 4th International Conference on Computer and Information Sciences, pp. 1-6, Aug. 2018.

An, et al., "Challenges, Tasks, and Opportunities in Modeling Agent-based Complex Systems", Ecological Modelling, vol. 457, 37 pages, Oct. 2021.

Ashish, Tiwari, "Automatic Control of Spacecraft", Automatic Control of Atmospheric and Space Flight Vehicles: Design and Analysis with MATLAB® and Simulink®, Birkhauser, pp. 301-357, Jan. 1, 2011.

Shu, et al., "Emotion Sensing for Mobile Computing", IEEE Communications Magazine, vol. 57, No. 11, pp. 84-90, Nov. 2019.

Badger, et al., "A Distributed Hierarchical Framework for Autonomous Spacecraft Control", IEEE Aerospace Conference, Big Sky, MT, USA, pp. 1-8, Mar. 2019.

Bates, Madeleine, "Models Of Natural Language Understanding", PNAS, vol. 92, No. 22, pp. 9977-9982, Oct. 24, 1995.

Benzi, et al., "Eutelsat Automatic Spacecraft Operations: System Evolution and Consolidation", American Institute of Aeronautics and Astronautics, 9 pages, Apr. 2010.

Bicchi, Antonio, "Of Robots, Humans, Bodies and Intelligence: Body Languages for Human Robot Interaction", Proceedings of the Tenth Annual ACM/IEEE International Conference on Human-Robot Interaction, p. 107, Mar. 2, 2015.

Schaefer, et al., "Relinquishing Manual Control: Collaboration Requires the Capability to Understand Robot Intent", International Conference on Collaboration Technologies and Systems, pp. 359-366, Oct. 31, 2016.

Blakely, et al., "Decision Tree Ensemble Machine Learning for Rapid QSTS Simulations", IEEE Power Energy Society Innovative Smart Grid Technologies Conference, 5 pages, Feb. 2018.

Boyd, John R., "The Essence of Winning and Losing", Unpublished lecture notes, vol. 12, No. 23, pp. 123-125, Jan. 1996.

Breiman, Leo, et al., "Bagging Predictors", Machine Learning, vol. 24, pp. 123-140, Aug. 1996.

Breiman, Leo, "Random Forests", Machine Learning, vol. 45, pp. 5-32, Oct. 2001.

Bridle, John S., "Probabilistic Interpretation of Feedforward Classification Network Outputs, with Relationships to Statistical Pattern Recognition", NATO Neurocomputing, pp. 227-236, 1990.

Brooks, Rodney A., "A Robust Layered Control System For A Mobile Robot", IEEE Journal On Robotics And Automation, vol. 2, No. 1, pp. 14-23, Mar. 1986.

Brooks, Rodney A., "Elephants Don't Play Chess", Robotics and Autonomous Systems, vol. 6, No. 1-2, pp. 3-15, Jun. 1990.

Bryson, Joanna Joy, "Intelligence By Design : Principles Of Modularity And Coordination For Engineering Complex Adaptive Agents", Doctoral Theses, Massachusetts Institute of Technology, 338 pp. 2001.

Bullo, et al., "Finite-Time Influence Systems and the Wisdom of Crowd Effect", SIAM Journal on Control and Optimization, vol. 58, No. 2, pp. 636-659, 2020.

Cadenas, et al., "Consensus Operators For Decision Making In Fuzzy Random Forest Ensemble", 11th International Conference on Intelligent Systems Design and Applications, pp. 1377-1382, 2011.

Camelin, et al., "Detection and Interpretation of Opinion Expressions in Spoken Surveys", IEEE Transactions on Audio, Speech, and Language Processing, vol. 18, No. 2, pp. 369-381, Feb. 2010.

Chaer, et al., "Hierarchical Adaptive Kalman Filtering For Interplanetary Orbit Determination", IEEE Transactions on Aerospace and Electronic Systems, vol. 34, No. 3, pp. 883-896, Jul. 1998.

Chen, et al., "Bayesian Optimization in AlphaGo", arXiv preprint arXiv:1812.06855, 7 pages, 2018.

Copeland, B. J., "The Modern History of Computing", The Stanford Encyclopedia of Philosophy, 13 pages, Dec 18, 2000.

Cordón, Oscar, "A Historical Review Of Evolutionary Learning Methods For Mamdani-type Fuzzy Rule-based Systems: Designing Interpretable Genetic Fuzzy Systems", International Journal of Approximate Reasoning, vol. 52, No. 06, pp. 894-913, Apr. 3, 2011.

Rossomando, Philip J., "The Achievement Of Spacecraft Autonomy Through The Thematic Application Of Multiple Cooperating Intelligent Agents", Telematics and Informatics, vol. 9, No. 3-4, pp. 205-219, 1992.

Craig, I. D., "Blackboard Systems", Artificial Intelligence Review, vol. 2, pp. 103-118, Jun. 1988.

Cramer, et al., "Design and Testing of Autonomous Distributed Space Systems", 35th Annual Small Satellite Conference, 12 pages, Jun. 3, 2021.

Dasarathy, et al., "A Composite Classifier System Design: Concepts And Methodology", Proceedings of the IEEE, vol. 67, No. 05, pp. 708-713, May 1979.

Deng, et al., "A Survey of Textual Emotion Recognition and Its Challenges", IEEE Transactions on Affective Computing, vol. 14, No. 1, pp. 49-67, Jan. 21, 2021.

Dennis, et al., "Verifiable Self-Aware Agent-Based Autonomous Systems", Proceedings of the IEEE, vol. 108, No. 7, pp. 1011-1026, Jul. 2020.

Dubois, et al., Fuzzy Sets And Systems. Theory And Applications. Mathematics in science and engineering, vol. 144, Journal of Symbolic Logic, vol. 47, No. 3, pp. 702-703, Sep. 1982.

Eberbach, Eugene, "Approximate Reasoning In The Algebra Of Bounded Rational Agents", International Journal of Approximate Reasoning, vol. 49, Issue 2, pp. 316-330, Oct. 22, 2007.

Engelen, et al., "A Survey On Semi-supervised Learning", Machine Learning, vol. 109, pp. 373-440, Nov. 15, 2019.

Ernest, et al., "Genetic Fuzzy Trees And Their Application Towards Autonomous Training And Control Of A Squadron Of Unmanned Combat Aerial Vehicles", Unmanned Systems, vol. 03, No. 03, pp. 185-204, 2015.

Ernest, et al., "Multi-agent Cooperative Decision Making using Genetic Cascading Fuzzy Systems", AIAA Infotech @ Aerospace, American Institute of Aeronautics and Astronautics, pp. 1-9, Jan. 2, 2015.

Ferreira, "Multi-objective Reinforcement Learning-based Deep Neural Networks For Cognitive Space Communications", 2017 Cognitive Communications for Aerospace Applications Workshop (CCAA), Cleveland, OH, USA, 2017, pp. 1-8, 2017.

(56) References Cited

OTHER PUBLICATIONS

Figueroa, et al., "Model-Based Systems Engineering, Real-Time Operations, and Autonomy", ASCEND, 12 pages, Nov. 2020.
Fisher, et al., "Towards A Framework For Certification of Reliable Autonomous Systems", Autonomous Agents and Multi-Agent Systems, vol. 35, 65 pages, Dec 23, 2020.
Flanagan, et al., "Subsumption and Fuzzy-Logic, Experiments in Behavior-Based Control of Mobile Robots", International Journal of Smart Engineering System Design, vol. 5, No. 3, pp. 161-175, 2003.
Freund, et al., "Experiments with a New Boosting Algorithm", Proceedings of the Thirteenth International Conference on International Conference on Machine Learning, 1996, pp. 148-156, Jul. 3, 1996.
Fuegi, et al., "Lovelace and Babbage and the Creation of the 1843 'Notes'", IEEE Annals of the History of Computing, vol. 25, Issue 4, pp. 16-26, Oct. 2003.
Fuertes, et al., "Improving Spacecraft Health Monitoring with Automatic Anomaly Detection Techniques Anomaly Detection Techniques", 14th international conference on space operations, 16 pages, May 16, 2016.
Ruckert, et al., "Designing For Sociality In HRI By Means Of Multiple Personas In Robots", 8th ACM/IEEE International Conference on Human-Robot Interaction, 2013, pp. 217-218, 2013.
Samuel, Arthur L., "Some Studies in Machine Learning Using the Game of Checkers", IBM Journal Of Research And Development, vol. 3, No. 3, pp. 210-229, Jul. 1959.
Schapire, Robert E., "The Strength Of Weak Learnability", Machine Learning, vol. 5, pp. 197-227, Jun. 1990.
Takagi, et al., "Fuzzy Identification Of Systems And Its Applications To Modeling And Control", IEEE Transactions on Systems, Man, and Cybernetics, vol. SMC-15, No. 1, pp. 116-132, Jan. 1985.
Tarride, Mario Iván, "The Complexity Of Measuring Complexity", Kybernetes, vol. 42 No. 2, February 1, pp. 174-184, 2013.
Treboux, et al., "Decision Tree Ensemble Vs. N.N. Deep Learning: Efficiency Comparison For A Small Image Dataset", International Workshop on Big Data and Information Security, pp. 25-30, 2018.
Turing, A. M., "I.—Computing Machinery and Intelligence", Mind, vol. LIX, No. 236, pp. 433-460, Oct. 1950.
Wildman, et al., "Measuring Cognition in Teams: A Cross-Domain Review", Human Factors, vol. 56, No. 5, pp. 911-941, Aug. 2014.
Wilson, et al., "Adaptive Optics For Daytime Deep Space Laser Communications From Mars", Digest of the LEOS Summer Topical Meetings, 2005, pp. 19-20, 2005.
Wollschlaeger, Gordon E., et al., "The Future of Industrial Communication: Automation Networks in the Era of the Internet of Things and Industry 4.0", IEEE Industrial Electronics Magazine, vol. 11, No. 1, pp. 17-27, Mar. 2017.
Wooldridge, et al., "Intelligent Agents: Theory and Practice", The Knowledge Engineering Review, vol. 10, No. 2, pp. 115-152, Jun. 1995.
Wu, et al., "Partner Selection In Sustainable Supply Chains: A Fuzzy Ensemble Learning Model", Journal of Cleaner Production, vol. 275, Dec 1, 2020.
Xue, et al., "Enabling Human-Robot-Interaction for Remote Robotic Operation via Augmented Reality", IEEE 21st International Symposium on "A World of Wireless, Mobile and Multimedia Networks", pp. 194-196, 2020.
Yager, Ronald R., "On A Hierarchical Structure For Fuzzy Modeling And Control", IEEE Transactions on Systems, Man, and Cybernetics, vol. 23, No. 4, pp. 1189-1197, Jul.-Aug. 1993.
Yager, Ronald R., "On The Construction Of Hierarchical Fuzzy Systems Models", IEEE Transactions on Systems, Man, and Cybernetics, Part C (Applications and Reviews), vol. 28, No. 1, pp. 55-66, Feb. 1998.
Yang, et al., "Understanding Discrete Facial Expressions in Video Using an Emotion Avatar Image", IEEE Transactions on Systems, Man, and Cybernetics, Part B (Cybernetics), vol. 42, No. 4, pp. 980-992, Aug. 2012.
Yerushalmy, et al., "Statistical Problems in Assessing Methods of Medical Diagnosis, with Special Reference to X-Ray Techniques", Public Health Reports, pp. 1432-1449, Oct. 3, 1947.
Zadeh, Lotfi A., "Fuzzy Sets As A Basis For A Theory Of Possibility", Fuzzy Sets and Systems, vol. 1, No. 1, pp. 3-28, Jan. 1978.
Zadeh, Lotfi A., "Outline of a New Approach to the Analysis of Complex Systems and Decision Processes", Ieee Transactions On Systems, Man, And Cybernetics. vol. SMC-3, No. 1, pp. 28-44, Jan. 1973.
Zaman, et al., "Realization of Omnidirectional CubeSat Crosslink by Wavelength-Selective Optical Transceiver", IEEE Journal on Miniaturization for Air and Space Systems, vol. 1, No. 1, pp. 47-55, Jun. 2020.
Zhao, et al., "Affective Computing for Large-scale Heterogeneous Multimedia Data: A Survey", ACM Transactions on Multimedia Computing, Communications, and Applications, vol. 15, Issue 3s, pp. 1-32, Dec 7, 2019.
Zhou, et al., "Low-level Interpretability And High-level Interpretability: A Unified View Of Data-driven Interpretable Fuzzy System Modelling", Fuzzy Sets and Systems, vol. 159, No. 23, pp. 3091-3131, Dec 1, 2008.
Zhu, et al., "Hierarchical Decision and Control for Continuous Multitarget Problem: Policy Evaluation With Action Delay", IEEE Transactions on Neural Networks and Learning Systems, vol. 30, No. 2, pp. 464-473, Feb. 2019.
Zong, et al., "On Application of Natural Language Processing in Machine Translation", 2018 3rd International Conference on Mechanical, Control and Computer Engineering, 2018, pp. 506-510, 2018.
Fuertes, et al., "Performance Assessment Of Nostradamus & Other Machine Learning-based Telemetry Monitoring Systems On A Spacecraft Anomalies Database", SpaceOps Conference, 14 pages, May 25, 2018.
Gacto, et al., "Interpretability Of Linguistic Fuzzy Rule-based Systems: An Overview Of Interpretability Measures", Information Sciences, vol. 181, No. 20, pp. 4340-4360, Oct. 15, 2011.
Galassi, et al., "Attention in Natural Language Processing", IEEE Transactions on Neural Networks and Learning Systems, vol. 32, No. 10, pp. 4291-4308, Oct. 2021.
Riedmaier, et al., "Unified Framework and Survey for Model Verification, Validation and Uncertainty Quantification", Archives of Computational Methods in Engineering, vol. 28, pp. 2655-2688, Aug. 7, 2020.
Georgeff, et al., "Reactive Reasoning And Planning", AAAI Proceedings, vol. 87, pp. 677-682, Jul. 1987.
Gilpin, et al., "Explaining Explanations: An Overview of Interpretability of Machine Learning", IEEE 5th International Conference on Data Science and Advanced Analytics, pp. 80-89, Oct. 2018.
Ridao, et al., "O2CA2: A New Hybrid Control Architecture for a Low Cost AUV", IFAC Proceedings Volumes, vol. 34, No. 7, pp. 311-316, Jul. 2001.
Gu, et al., "Self-organizing Fuzzy Inference Ensemble System For Big Streaming Data Classification", Knowledge-Based Systems, vol. 218, Article 106870, 46 pages, Apr. 22, 2021.
Hanebeck, et al., "Genetic Optimization Of Fuzzy Networks", Fuzzy Sets and Systems, vol. 79, No. 1, pp. 59-68, Apr. 8, 1996.
Hansen, et al., "Neural Network Ensembles", IEEE Transactions On Pattern Analysis And Machine Intelligence, pp. 993-1001, Oct. 1990.
Hao, et al., "Asymmetric Cryptographic Functions based on Generative Adversarial Neural Networks for Internet of Things", Future Generation Computer Systems, vol. 124, pp. 243-253, Nov. 2021.
Hayes-Roth, Barbara, "A Blackboard Architecture For Control", Artificial Intelligence, vol. 26, Issue 3, pp. 251-321, Jul. 1985.
Hemmati, Hamid, "Optical Systems For Free-space Laser Communications", Current Developments in Lens Design and Optical Engineering IV, vol. 5173, pp. 64-68, Nov. 3, 2003.
Holcomb, et al., "Overview on Deep-Mind and Its AlphaGo Zero AI", Proceedings of the International Conference on Big Data and Education, pp. 67-71, Mar. 9, 2018.
Hong, et al., "Hybrid Predictive Ensembles: Synergies Between Human and Computational Forecasts", Journal of Social Computing, vol. 2, No. 2, pp. 89-102, Jun. 2021.

(56) References Cited

OTHER PUBLICATIONS

Isahara, Hitoshi, "Resource-based Natural Language Processing", International Conference on Natural Language Processing and Knowledge Engineering, 2007, pp. 11-12, 2007.
Jacobs, et al., "Adaptive Mixtures of Local Experts", Neural Computation, vol. 3, Issue 1, pp. 79-87, Mar. 1991.
Jang, et al., "Neuro-Fuzzy and Soft Computing-A Computational Approach to Learning and Machine Intelligence", IEEE Transactions on Automatic Control, vol. 42, No. 10, pp. 1482-1484, Nov. 1997.
Jiang, et al., "Mixed-Initiative Human-Robot Interaction: Definition, Taxonomy, and Survey", IEEE International Conference on Systems, Man, and Cybernetics, Hong Kong, China, 2015, pp. 954-961, 2015.
Jordan, et al., "Hierarchical Mixtures Of Experts And The EM Algorithm", Neural Computation, vol. 6, No. 2, pp. 181-214, Mar. 1994.
Jordan, et al., "Hierarchies Of Adaptive Experts", Advances in Neural Information Processing Systems, pp. 985-992, 1991.
Jorgensen, et al., "Autonomous Flight Control Using Hierarchical Ensembles Of Autonomous Decision Systems", Proceedings of the 44th Annual American Astronautical Society Guidance, Navigation, and Control Conference, pp. 1369-1390, 2022.
Kahn, et al., "Validating Interaction Patterns In HRI", 2010 5th ACM/IEEE International Conference on Human-Robot Interaction, 2010, pp. 183-184, 2010.
Kahou, et al., "Recurrent Neural Networks for Emotion Recognition in Video", Proceedings of the ACM on International Conference on Multimodal Interaction, pp. 467-474, Nov. 9, 2015.
Kokorakis, et al., "A Blackboard Based Hybrid Multi-Agent System for Improving Classification Accuracy Using Reinforcement Learning Techniques", 37th SGAI International Conference on Artificial Intelligence, pp. 47-57, Dec 12, 2017.
Kosko, Bart, "Fuzziness Vs. Probability", International Journal of General Systems, vol. 17, No. 2-3, pp. 211-240, 1990.
Kozai, Yoshihide, "New Determination of Zonal Harmonics Coefficients of the Earth's Gravitational Potential", SAO Special Report, No. 165, 43 pages, 1964.
Liu, et al., "A MultiBoosting Based Transfer Learning Algorithm", Journal of Advanced Computational Intelligence and Intelligent Informatics, vol. 19, No. 3, pp. 381-388, May 20, 2015.
Liu, et al., "Ensemble Transfer Learning Algorithm", EEE Access, vol. 6, pp. 2389-2396, Dec 13, 2017.
Malchus, et al., "The Role Of Emotional Congruence In Human-robot Interaction", 8th ACM/IEEE International Conference on Human-Robot Interaction, Mar. 3, 2013, pp. 191-192, 2013.
Mamdani, et al., "An Experiment In Linguistic Synthesis With A Fuzzy Logic Controller", International Journal of Man-Machine Studies, vol. 7, No. 1, pp. 1-13, Jan. 1975.
Mantyla, M., "A Modeling System For Top-down Design Of Assembled Products", IBM Journal of Research and Development, vol. 34, No. 5, pp. 636-659, Sep. 1990.
Markou, et al., "Novelty Detection: A Review-Part 2: Neural Network Based Approaches", Signal Processing, vol. 83, No. 12, pp. 2499-2521, Dec 2003.
Sugeno, et al., "Structure Identification Of Fuzzy Model", Fuzzy Sets and Systems, vol. 28, No. 1, pp. 15-33, Oct. 1988.
Metz, Charles E., "Basic Principles of ROC Analysis", Seminars in Nuclear Medicine, vol. 8, No. 4, pp. 283-298, Oct. 1978.
Veres, Sandor, "Principles, Architectures And Trends In Autonomous Control", The IEE Seminar on Autonomous Agents in Control, pp. 1-9, 2005.
Moore, Gordon E., "Cramming More Components onto Integrated Circuits", Electronics, vol. 38, No. 8, 6 pages, Apr. 19, 1965.
Müller, et al., "Modeling Reactive Behaviour In Vertically Layered Agent Architectures", Intelligent Agents, Conference paper, pp. 261-276, Aug. 1994.
Nauck, et al., "How The Learning Of Rule Weights Affects The Interpretability Of Fuzzy Systems", IEEE International Conference on Fuzzy Systems Proceedings, vol. 2, pp. 1235-1240, 1998.
Raju, et al., "Hierarchical Fuzzy Control", International Journal of Control, vol. 54, No. 5, pp. 1201-1216, 1991.
Noroozi, et al., "Audio-Visual Emotion Recognition in Video Clips", IEEE Transactions on Affective Computing, vol. 10, No. 1, pp. 60-75, 2019.
Otter, et al., "A Survey of the Usages of Deep Learning for Natural Language Processing", IEEE Transactions on Neural Networks and Learning Systems, vol. 32, No. 2, pp. 604-624, Feb. 2021.
Patton, et al., "Contextual Analysis of Social Media: The Promise and Challenge of Eliciting Context in Social Media Posts with Natural Language Processing", Proceedings of the AAAI/ACM Conference on AI, Ethics, and Society, pp. 337-342, Feb. 7, 2020.
Radanliev, et al., "Artificial Intelligence and the Internet of Things in Industry 4.0", CCF Transactions on Pervasive Computing and Interaction, vol. 3, pp. 329-338, Mar. 16, 2021.
Polikar, Robi, "Ensemble Based Systems In Decision Making", IEEE Circuits and Systems Magazine, vol. 6, No. 3, pp. 21-45, Sep. 6, 2006.
Prado, et al., "Forecasting based on an ensemble Autoregressive Moving Average—Adaptive neuro—Fuzzy inference system—Neural network—Genetic Algorithm Framework", Energy, vol. 197, No. 117159, Apr. 15, 2020.
Samuel, Arthur L., "Some Studies in Machine Learning Using the Game of Checkers", IBM Journal Of Research And Development, vol. 3, No. 3, Jul. 1959, pp. 210-229.
Schapire, Robert E., "The Strength Of Weak Learnability", Machine Learning, vol. 5, Jun. 1990, pp. 197-227.
Shu , et al., "Emotion Sensing for Mobile Computing", IEEE Communications Magazine, vol. 57, No. 11, Nov. 2019, pp. 84-90.
Sugeno , et al., "Structure Identification Of Fuzzy Model", Fuzzy Sets and Systems, vol. 28, Issue 1, Oct. 1988, pp. 15-33.

* cited by examiner

AUTONOMOUS CONTROL USING HIERARCHICAL ENSEMBLES OF AUTONOMOUS DECISION SYSTEMS

CROSS-REFERENCE TO RELATED APPLICATIONS

This application claims priority to U.S. Provisional Patent Application No. 63/364,042, filed on May 3, 2022, and titled "HIERARCHICAL ENSEMBLE OF AUTONOMOUS DECISION SYSTEMS FOR AUTOMATED REASONING." The disclosure of which is hereby incorporated in its entirety.

BACKGROUND

Small satellite technology performance and capability have advanced at a pace that seems to increase exponentially even as the size, weight, and power (SWaP) needed to yield such performance have decreased. Taken in context with the advent of a proliferated low Earth orbit fueled by plummeting launch costs, promises of low-latency, continuously connected, pervasive communications and remote sensing spacecraft are no longer science fiction, they can be engineered fact.

Technological advancement also means an increase in complexity of individual spacecraft, where a single unit no longer hosts a single payload, but may hold several instruments and associated supporting subsystems that all compete for the same resources. It no longer waits for perfect timing before gathering or downlinking data, it needs to provide constant data at high downlink speeds multiple times each orbit or even continuously. An individual spacecraft may often be required to act as part of a swarm of spacecraft thereby enhancing the data product by increasing both spatial and temporal resolution. These increases in performance requirements are enabled by increased system-of-systems complexity, which means there are more controllable signals and systems that must be managed.

Furthermore, as the number of connected systems increases, the complexity of managing these swarms or constellations taxes ground operators and support infrastructure. Commanding large networks of spacecraft has already leveraged autonomy, both on-board and on the ground, but moving forward such autonomy must advance to the point of "minimal human oversight" before enormous constellations of satellites can be maintained in a cost-effective manner.

Generally, the decision space dimensionality, or the number of logic rules needed to completely cover input-output combination mappings, increases exponentially with an increase in the input space and linearly with outputs. It is impractical to design an autonomous system to cover all possible combinations without an enormous amount of data and precise knowledge of the operating environment, possible failure modes, and other perturbances that will inevitably degrade the system performance. The list of unknown unknowns is too long and unpredictable to investigate in full. If it were easy to predict, designers would simply account for the scenario.

SUMMARY

A Hierarchical Ensembles of Autonomous Decision Systems (HEADS) system with a recursive ensemble weighting update is proposed. The system is built on fuzzy logic leading to an understandable and tractable logic design that leverages subject matter experts to design system operations. The hierarchical structure enables multi-layered logic for granular control and decisions incorporating inferred information. The control output from each ensemble is a mixture from independently trained fuzzy systems processed through a gating network. The gating network weights are updated recursively. Each expert uses a subset of the input space to minimize per-expert complexity and support ensemble robustness under uncertain or evolving state realizations and operating environments. Finally, autonomy based on fuzzy systems offers the potential for increased human comprehension of an agent's status and decision logic.

Additional advantages will be set forth in part in the description that follows, and in part will be obvious from the description, or may be learned by practice of the aspects described below. The advantages described below will be realized and attained by means of the elements and combinations particularly pointed out in the appended claims. example It is to be understood that both the foregoing general description and the following detailed description are examples and explanatory only and are not restrictive of the systems and methods as claimed.

BRIEF DESCRIPTION OF THE DRAWINGS

The accompanying figures, which are incorporated in and constitute a part of this specification, illustrate several aspects of the disclosure, and together with the description, serve to explain the principles of the disclosure.

DETAILED DESCRIPTION

Figure 1:
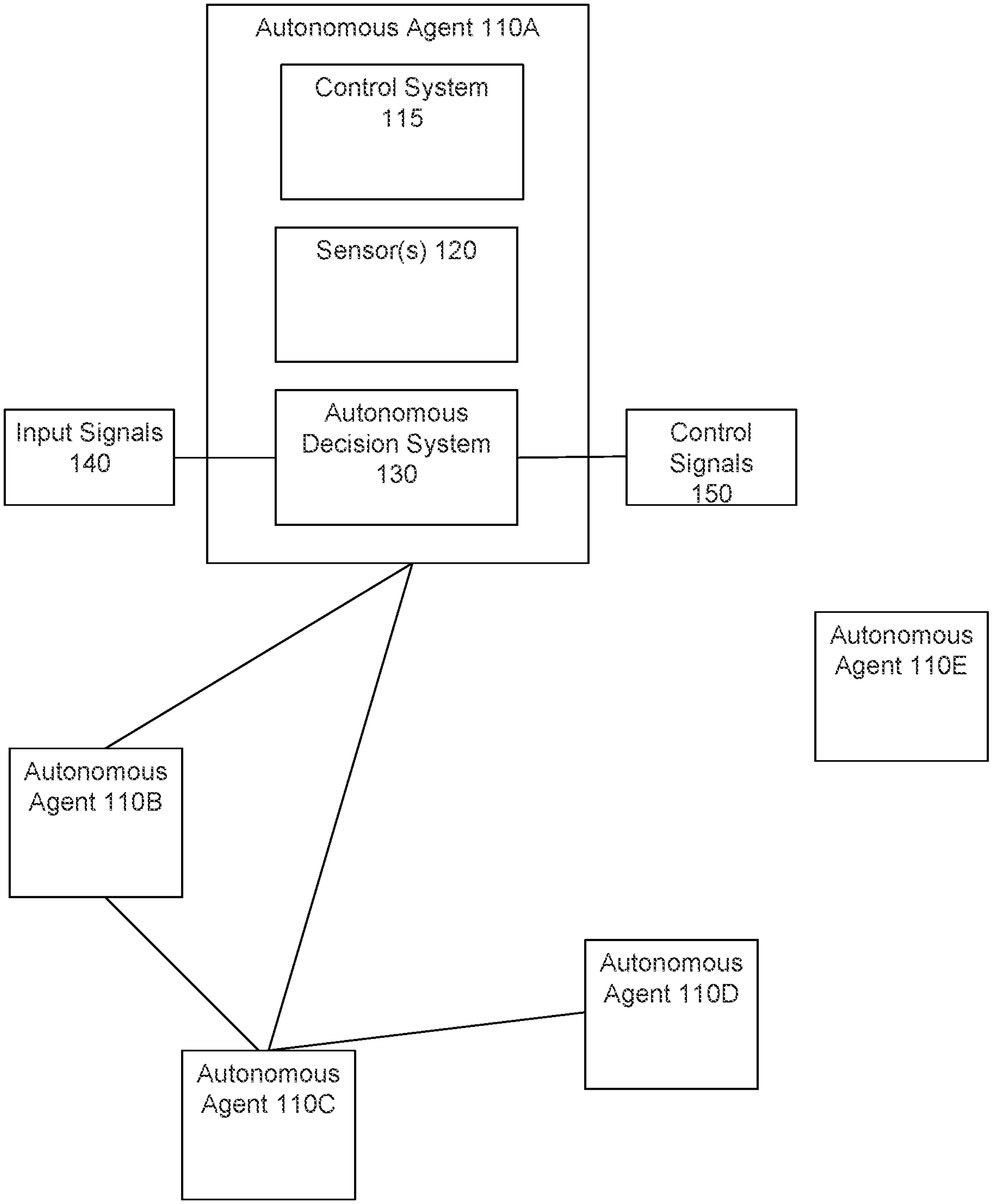
FIG. 1 is an illustration of an example environment for using autonomous decision systems to coordinate the operation of a plurality of autonomous agents.

FIG. 1 is an illustration of an example environment 100 for using autonomous decision systems 130 to coordinate the operation of a plurality of autonomous agents 110 (e.g., the agents 110A, 110B, 110C, 110D, and 110E). The autonomous agents 110 may include robots or autonomous vehicles such as cars, planes, and spacecraft (e.g., satellites). Each agent 110 may (or may not) communicate with each other wirelessly using one of many suitable networking technologies as represented by the lines between the agents 110. In particular, the autonomous decision system 130 described herein may function even where some or none of the autonomous agents 110A are able to communicate with each other for extended periods of time. While only five agents 110 are shown, it is for illustrative purposes only. There is no limit to the number of agents 110 that may be supported.

As shown by the agent 110A, each agent 110 may include a control system 115, one or more sensors 120, and an autonomous decision system 130. The sensors 120 may include a variety of sensors 120 such as cameras, thermometers, radar sensors, lidar sensors, etc. Any type of sensor 120 may be supported. The autonomous decisions system 130 may be implemented using one or more general purpose computing devices such as the computing device 900 illustrated with respect to FIG. 9.

The control system 115 may control the functioning of the associated agent 110 including functions related to navigation (e.g., direction, velocity, braking), agent state (e.g., sleep, reboot, or reset), as well as the operation of the various sensors 120 (e.g., activate, deactivate, and power mode).

The autonomous decisions system 130 may receive one or more input signals 140, and in response to the input signals 140, may generate control signals 150. The control signals 150 generated by the autonomous system 130 may then be used by the control system 115. For example, a control signal 150 may indicate that a camera sensor 120 should be disabled. In response to receiving the control signal 150, the control system 115 may disable the camera sensor 120.

The input signals 140 may include a variety of signals 140 including signals generated by the sensors 120 (e.g., current location, velocity, acceleration, temperature), signals 140 generated by the control system 115 (e.g., status of the various sensors 120, current location, power level). The input signals 140 may also include signals 140 received from other autonomous agents 110. Any type of signal may be supported.

Figure 2:
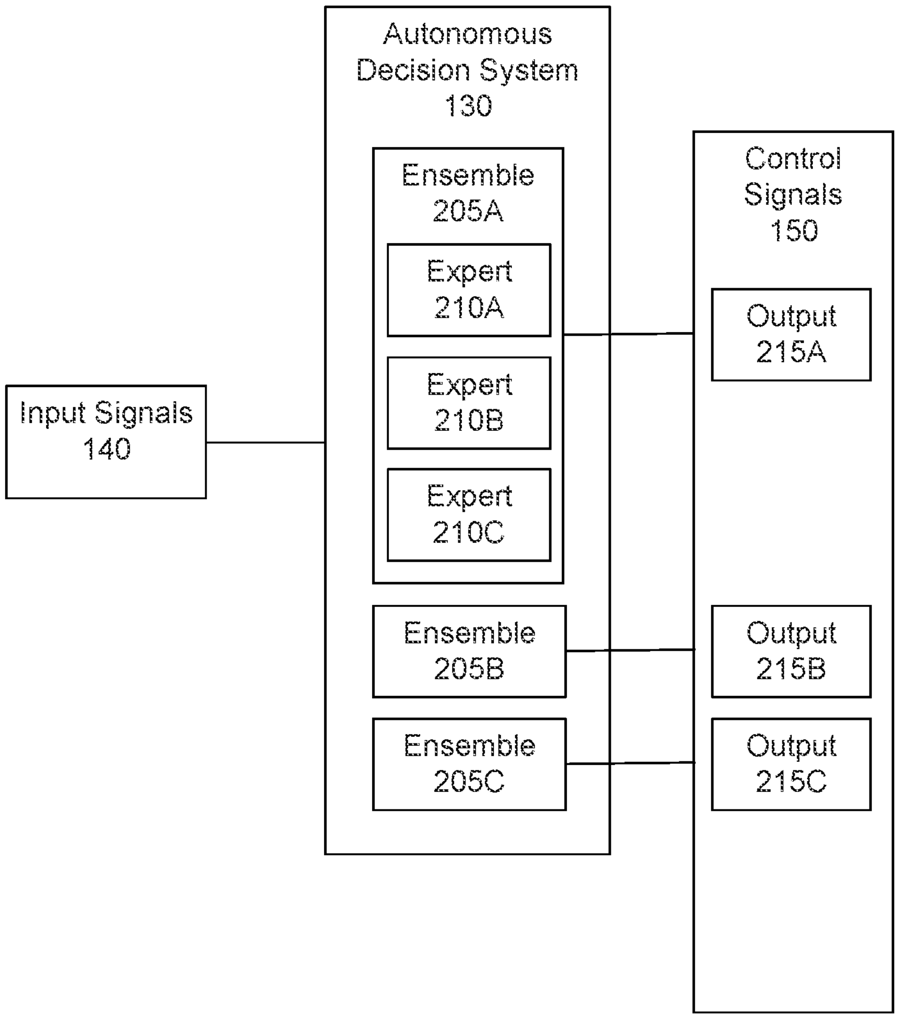
FIG. 2 is an illustration of an example autonomous decision system.

FIG. 2 is an illustration of an example autonomous decision system 130. As shown, the system 130 include a plurality of ensembles 205 (e.g., the ensembles 205A, 205B, and 205C). Each ensemble 205 generates a corresponding output 215 (e.g., the outputs 215A, 215B, and 215C). The outputs 215 make up the control signals 150. Each output 215 may be associated with a confidence that corresponds to how confident the corresponding ensemble 205 is with the output 215.

Ensembles 205 are a group of experts 210 separately trained or otherwise managed that are tasked with addressing the same question. The outputs of all experts 210 are combined to arrive at a single output 215 which has the benefit of a variety of supporting experts 210 that taken together may provide an answer closer to the truth than any single expert 210 could do. With enough individual experts 210 trained across the problem domain, some are bound to show excellent performance and some will be poor performers. The goal is to train the ensemble 215 such that the overall performance is acceptable across the range of anticipated operating environments or states.

As shown in the ensemble 205A, each ensemble 205 may include one or more experts 210 (e.g., the experts 210A, 210B, and 210C) that each generate a value based on some or all of the input signals 140 using fuzzy logic. The ensemble 205 may then use the values generated by some or all of the experts 210 to generate the corresponding output 215. The operation of the experts 210 is described further below. Note that input signals 140 as described herein may further include the output 215 of other ensembles 205.

Note the possible arrangements of ensembles and experts is not limited to those shown and described in FIG. 2. In particular, ensembles 205 are not limited to containing only experts 210 but may contain a combination of experts 210 and other ensembles 205, or may contain just ensembles 205. Furthermore, each expert 210 may itself be made up of one of one or more experts 210 or ensembles 205 or may even be its own autonomous decision system 130 with its own arrangement of ensembles 205 and/or experts 210.

The structure of the proposed autonomous decision system 130 combines the benefits of ensemble systems using fuzzy logic with the multi-objective decision making capability of a hierarchical system. Applied to the autonomous operation of an agent 110 with multiple payloads and objectives such as a spacecraft, this system 130 provides accurate and robust performance when faced with degraded subsystems or competing objectives.

The proposed structure of hierarchical ensembles of fuzzy experts can be extended across multiple systems to account for cooperative operations among teams or swarms of satellites. Assuming a minimal amount of crosslinked data transfer, such coordination is straightforward and enables a more robust network that can self-heal from subsystem or spacecraft failures. This can be done without centralized control, which reduces network susceptibility to single-node failure. Finally, having this capability on-board each spacecraft reduces the burden on ground infrastructure and operators, meaning increased efficiency and cost-effectiveness.

In some embodiments, the experts of 210 of the autonomous decision system 130 may use fuzzy logic. For purposes of background, Fuzzy Logic is now described.

Fuzzy Logic can be seen as an extension of Boolean logic that better captures uncertainty. The Fuzzy inference System (FIS) has been extended to be adaptive and combined with neural networks to increase performance. Fuzzy Logic is a non-probabilistic approach to addressing uncertainty where we are concerned more with the degree to which something happens opposed to whether something happens.

A fuzzy set maps part of an input variable domain to [0, 1] and is represented by a linguistic variable. An activation function (which can be continuous or discrete) and its parameters are chosen to enable sufficient coverage and overlap of the input variable domain into the fuzzy domain. FIG. 1 shows this process for an illustrative example. Common functions include triangles and trapezoids due to their straightforward parameterization.

Output fuzzy sets are similar to input fuzzy sets in definition and implementation. The main difference is that input fuzzy sets are used as rule antecedents and output fuzzy sets as rule consequents.

The number of fuzzy sets used to represent an input or output can vary between fuzzy expert systems. For example, one expert might divide an input into three fuzzy sets, another expert might use seven fuzzy sets. This is a design choice driven by the granularity requirements of the rule set in use by the specific fuzzy expert. This variability is one way the autonomous decision system 130 increases robustness, since each expert is likely to not perform well over different sections of the input space.

In some embodiments, a rule may be written in the form of standard logic using AND ($\wedge$), OR ($\vee$), NOT ($\neg$) and THEN ($\rightarrow$) terms and parenthetical grouping to evaluate into a rule consequent activation. For input fuzzy sets A, B, C, and D, and output fuzzy sets Y and Z, an example a rule set might read:

1. If A or C then Y
2. If not D then Y
3. If (A or B) and not (C and D) then Z
4. if not A or (B and D) then Z Fuzzy logic rule evaluation combines fuzzy set activation levels for all antecedent terms. This process is referred to as "fuzzy reasoning" as it generalizes the application of logic inference. The value resulting from fuzzy reasoning is the output fuzzy set, or rule consequent, activation.

Rule evaluation may apply to one or more antecedent terms. When multiple antecedents are considered, fuzzy logic operators dictate value propagation:

1. AND: (A and B)≡min(A, B)
2. OR: (A or B)≡max(A, B)
3. NOT: (not A)≡(1−A)

Parenthetical statements group terms:

1. (A=0.5 or B=0.8) and C=0.2→0.2
2. A=0.5 or (B=0.8 and C=0.2)→0.5

The resulting activation level is then used to bound the output fuzzy set, or consequent, activation. This process is where fuzzy expert systems handle the uncertainty of "to what degree," as an output inference can be considered "true" to the extent that the consequent activates.

After rule evaluation, the fuzzy expert system consists of one or more output fuzzy set activations. Any particular output fuzzy set can have zero or more component activations that need to be combined via T-norm or T-conorm before the fuzzy expert system can provide a usable crisp output.

The T-norm operator is a function T: [0, 1]×[0, 1]→[0, 1] that defines fuzzy intersection. Common T-norms include the minimum and algebraic product. The T-conorm (or S-norm) similarly maps S: [0, 1]×[0, 1]→[0, 1]. Common S-norms include the maximum and algebraic sum S(a, b)=a+b−ab. The T-norm and T-conorm provide the basis for combining fuzzy sets via intersection and union, respectively.

The final duty of a fuzzy expert system is to produce a crisp output value built from the aggregated output fuzzy sets. This process is called "defuzzification" as it takes fuzzy values as input and gives a crisp output. Common methods include: Centroid of Area, Bisector of Area, Mean of Maximum, Smallest of Maximum, and Largest of Maximum. As many of these operations consist of calculating areas or means of activation-limited output fuzzy sets, the computational burden may be significant. The selection of a defuzzification operation may depend on the output variable and whether the system must be lenient or conservative when reasoning.

Several fuzzy inference systems have been defined that provide the T-norm and T-conorm selections for both rule antecedent combination and rule consequent aggregation. Some of these benefit from crisp outputs after consequent aggregation, reducing the computational burden from defuzzification.

Figure 3:
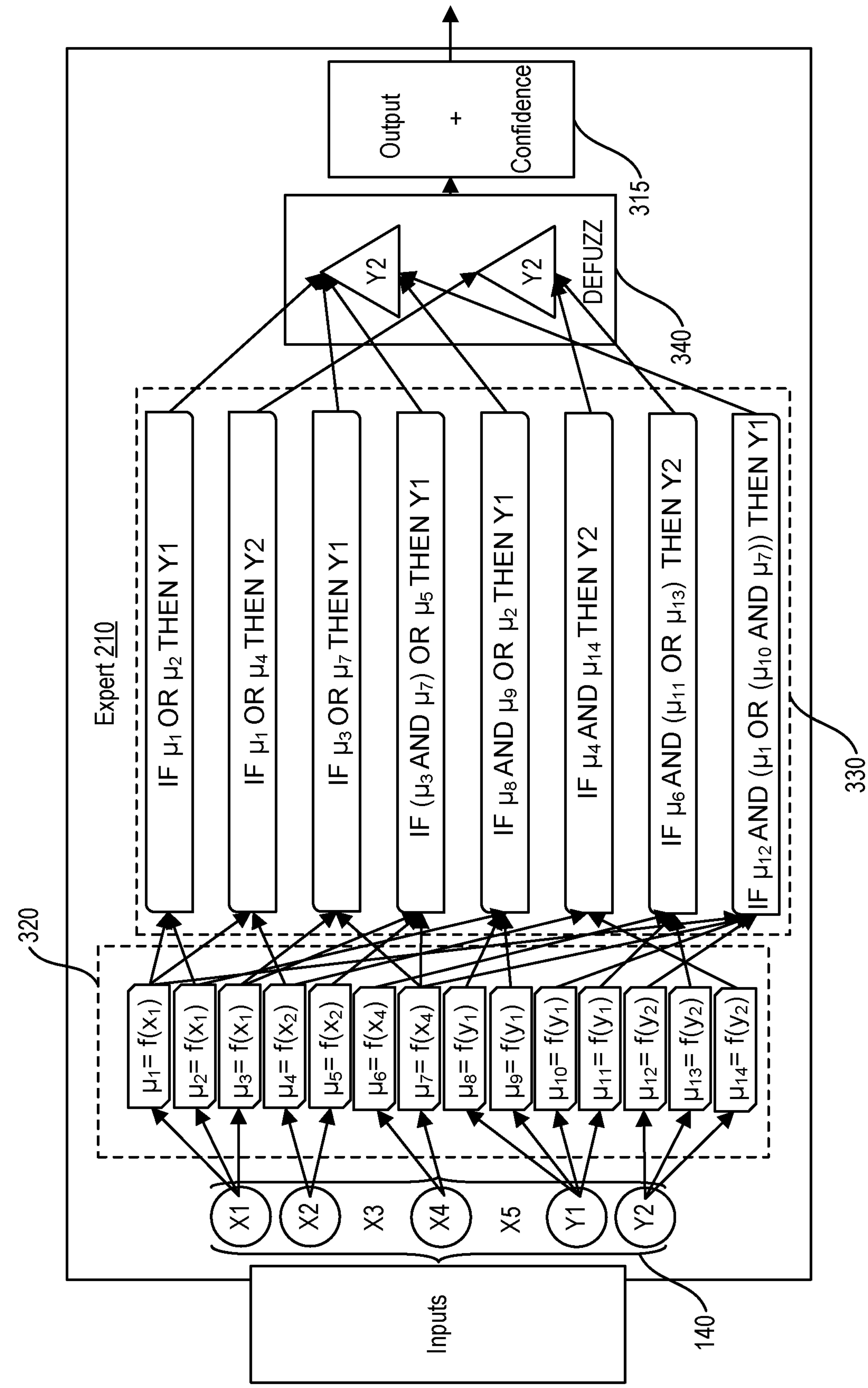
FIG. 3 is an illustration of an example expert implementing the fuzzy expert system described above.

FIG. 3 is an illustration of an example expert 210 implementing the fuzzy expert system described above. As shown, the expert 210 receives the input signals 140 and generates one or more sub signals based on some or all of the input signals 140. For example, an input signal 140 such as a temperature value could be used to generate one or more Boolean sub-signals such as temperature_low, temperature_high, and temperature_normal. Each sub-signal may be generated from one or more input values 140 using one or more functions 320 provided by one or more users or administrators.

The expert 210 further includes a plurality of rules 330. As shown, each rule 330 receives one or more sub-signals, applies one or more logical operators to the received sub-signals using fuzzy logic as described above. Each rule 330 may be created by a user or administrator. As shown, each rule 330 is written using one or more logical operators. Using logical operators allows one or more human reviewers to quickly and easily create rules 330 as well as understand the function of each existing rule 330. However, other types of syntax may be used for the rules 330.

In addition, in some embodiments, the sub-signals and terms and operators of each rule 330 (referred to as parameters) may be adjusted or optimized to improve the performance of the expect 210. In one embodiment, the parameters may be adjusted using a genetic algorithm. Other methods for optimizing parameters may be used.

The output of each of the rules 330 may be received by a defuzz module 340. The defuzz module 340 may perform one or more defuzzification operations as described above. The performed defuzzification operations may be selected by a user or administrator. The defuzz module 340 may generate the output 315 of the expert 210, which may include a confidence value.

Figure 4:
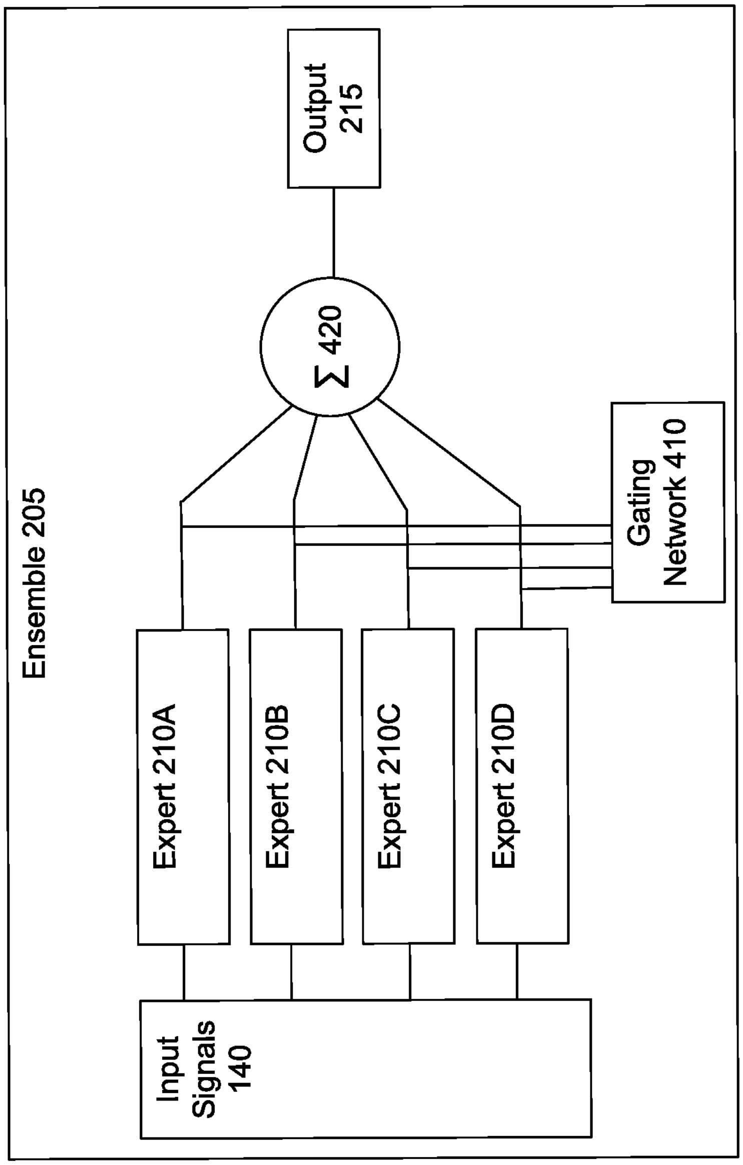
FIG. 4 is an illustration of an example ensemble.

Continuing to FIG. 4 is an illustration of an example ensemble 205. As described above, each ensemble 205 may be responsible for generating a particular output 215 of the control signals 150 used by the control system 115. The ensemble 205 receives some or all of the input signals 140, and each expert 210 (i.e., the experts 210A, 210B, 210C, and 210D) receives a subset of the input signals 140 and uses the subset to generate an output signal 315 using fuzzy logic as described above with respect to FIG. 3.

The ensemble 205 may further include a gating network 410 that combines the output signals 315 from each of the experts 210 using a function 420. The result of the function 420 is the output 215. An example function 420 is the following softmax function where $I_j$ is the output 310 of a particular expert 210 of a total of K experts 210 and exp is the exponential function:

$$O_j = \frac{\exp(I_j)}{\Sigma_k \exp(I_k)}$$

The softmax function gives larger weight to relatively larger values in a set. However, the ensemble 205 does not need to produce the output 215 based on the largest output 315 of a single expert 210. Larger outputs 315 do not necessarily mean more correct.

Instead the ensemble 205 may use the confidence value associated with each output 315 to weigh each output 315 in the softmax equation. The output 215 is then the weighted sum of the outputs 315 of the experts 210. As may be appreciated, a single expert 210 with a higher confidence in its output 315 will impact the output 215 of the ensemble 205 to a greater extent than the other experts 210. Similarly, if all of the experts 210 have similar confidence value then they will each influence the output 315 is a similar manner.

Figure 5:
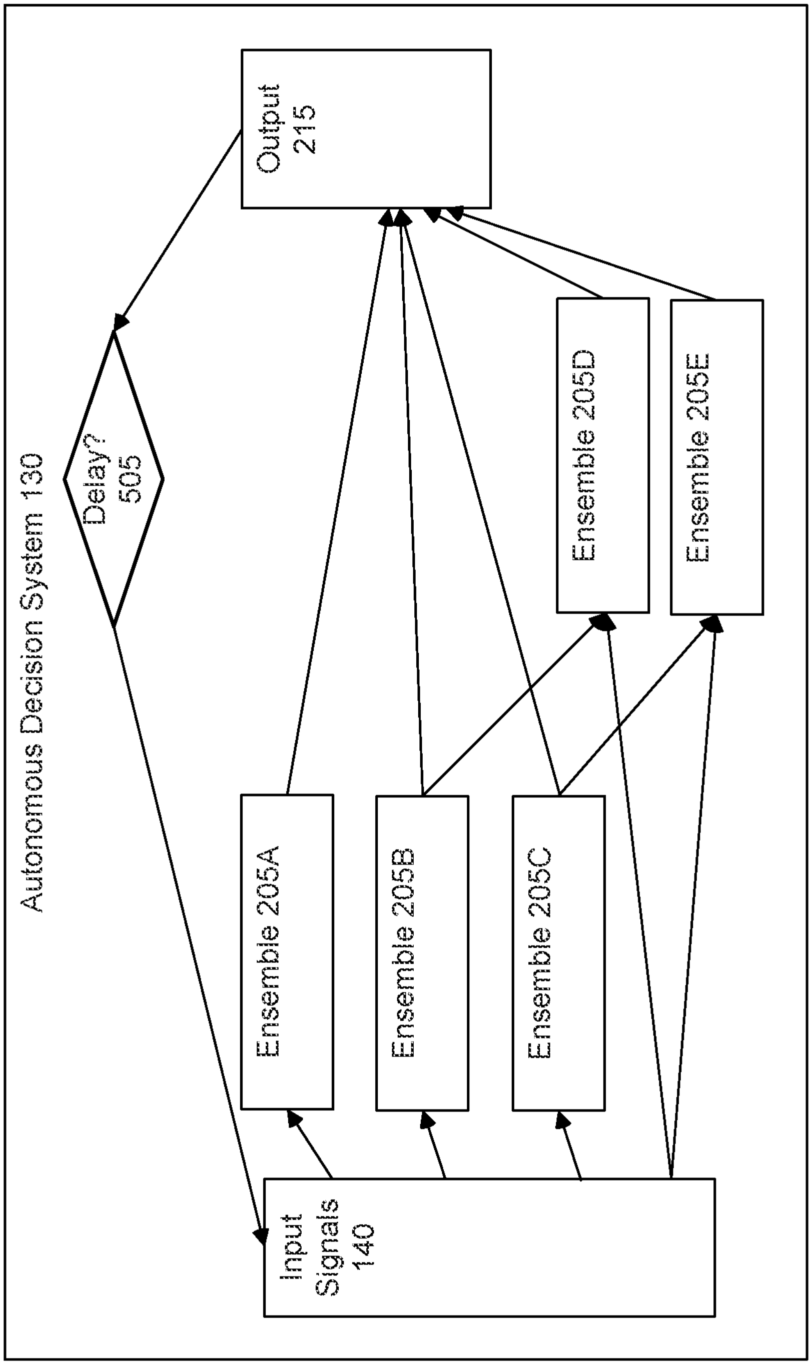
FIG. 5 is an illustration of an example autonomous decision system.

FIG. 5 is another illustration of an example autonomous decision system 130. In the example shown, the ensembles 205A, 205B, and 205C all receive inputs from the input signal 140. The ensembles 205D and 205E receive, along with the input signals 140, output signals (e.g., the output 315) from each of the ensembles 205B and 205C. Accordingly, the ensembles 205D and 205E are able to consider the outputs 315 of the other ensembles in response to the current input signals 140.

In addition, some or all of the output 215 is fed back to all of the ensembles 205 as part of the input signals 140. As shown, the autonomous decision system 130 first adds some amount of delay 505 to the output 215. Accordingly, the output 215 fed back into the ensembles 205 may represent the output 215 generated by the ensembles 205 in response to the previous set of input signals 140. Accordingly, the rules 330 used by the experts 210 in each ensemble 205 can consider a variety of input including the current output 215 of other ensembles 205 as well as the previous output 215 (i.e., with the delay 505) of other ensembles 205.

Figure 6:
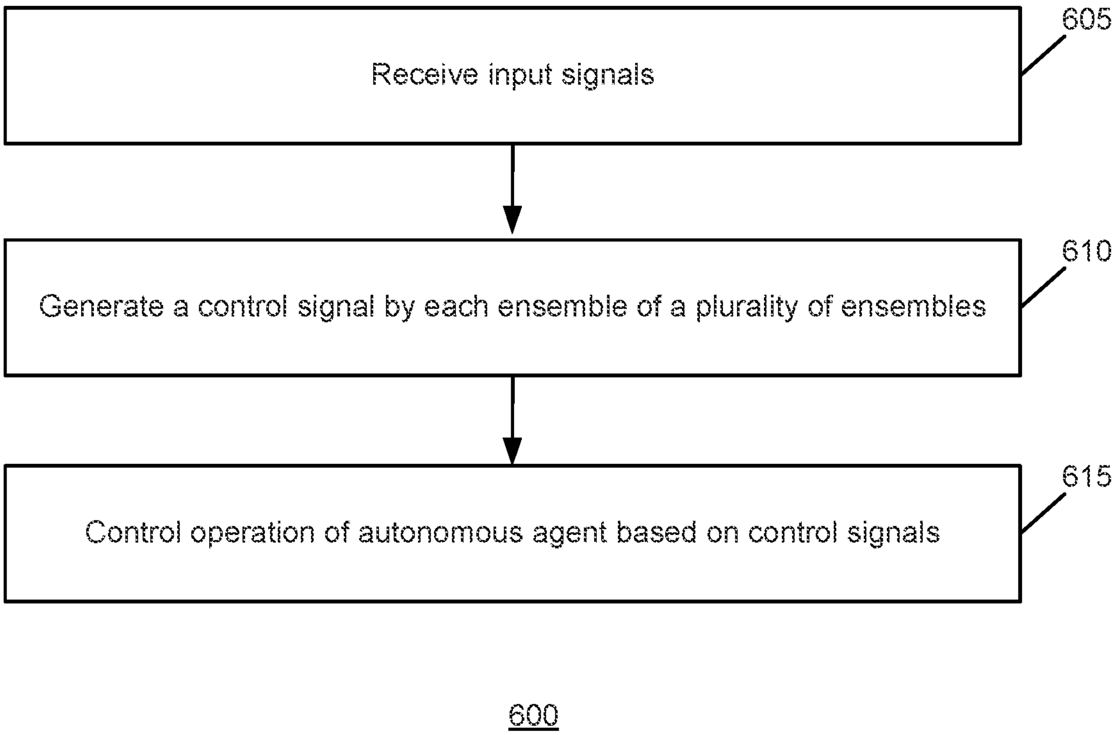
FIG. 6 is an illustration of an example method for controlling the operation of an autonomous agent.

FIG. 6 is an illustration of an example method 600 for controlling the operation of an autonomous agent. The method 600 may be implemented by an autonomous decision system 130 of an autonomous agent 110. In some embodiments, the autonomous agent 110 may be an autonomous vehicle.

At 605, a plurality of input signals is received. The plurality of inputs may be the input signals 140 and may be received by the autonomous decision system 130. In some embodiments, the input signals 140 may include signals generated by one or more sensors 120 associated with the autonomous agent, one or more signals generated by an ensemble of the autonomous decision system 130, and one or more signals received from other autonomous agents 110 or other external sources (e.g., control signals 150).

At 610, control signals are generated. The control signals 150 are generated by the autonomous decision system 130. In some embodiments, the autonomous decision system 130 may include an ensemble 205 for each of the plurality of control signals 150. Each ensemble 205 may generate a respective one of the control signals 150.

At 615, operation of the autonomous agent is controlled based on the control signals. The control system 115 may control the autonomous agent 110 based on the control signals 150. For example, the control system 115 may activate or deactivate one or more sensors 120, or may perform one or more navigation maneuvers (e.g., accelerate, decelerate, turn).

Figure 7:
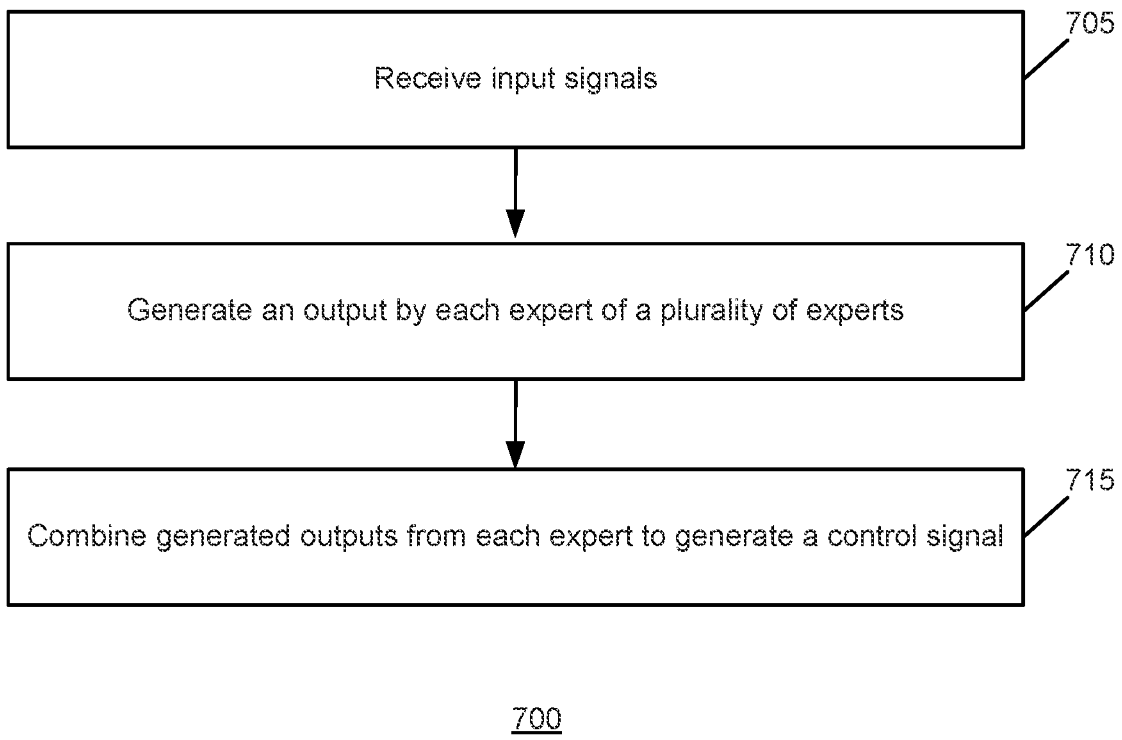
FIG. 7 is an illustration of an example method for combining signals from experts.

FIG. 7 is an illustration of an example method 700 for combining signals from experts. The method 700 may be performed by one or more ensembles 205.

At 705, a plurality of input signals is received. The plurality of inputs may be the input signals 140 and may be received by the ensemble 205. The plurality of signals may be a subset of the input signals 140 or all of the input signals received by the corresponding autonomous decision system 130. The ensemble 205 may be one of a plurality of ensembles 205 associated with the autonomous decision system 130, with each ensemble 205 generating a different control signal 150 of the plurality of control signals 150. The ensemble 205 may include a plurality of experts 210.

At 710, a signal is generated by each expert of the ensemble. Each expert may generate a signal or output 315. The output 315 generated by each expert 210 may be associated with a confidence that reflects how confident the expert is that the output 315 is correct.

At 715, the generated outputs from each expert are combined to generate a control signal. The generated outputs 315 from each expert 210 may be combined by the ensemble 205. In some embodiments, each output 315 may be assigned a weight that is based on its associated confidence. The weighted outputs 315 may be combined using a softmax function, for example.

Figure 8:
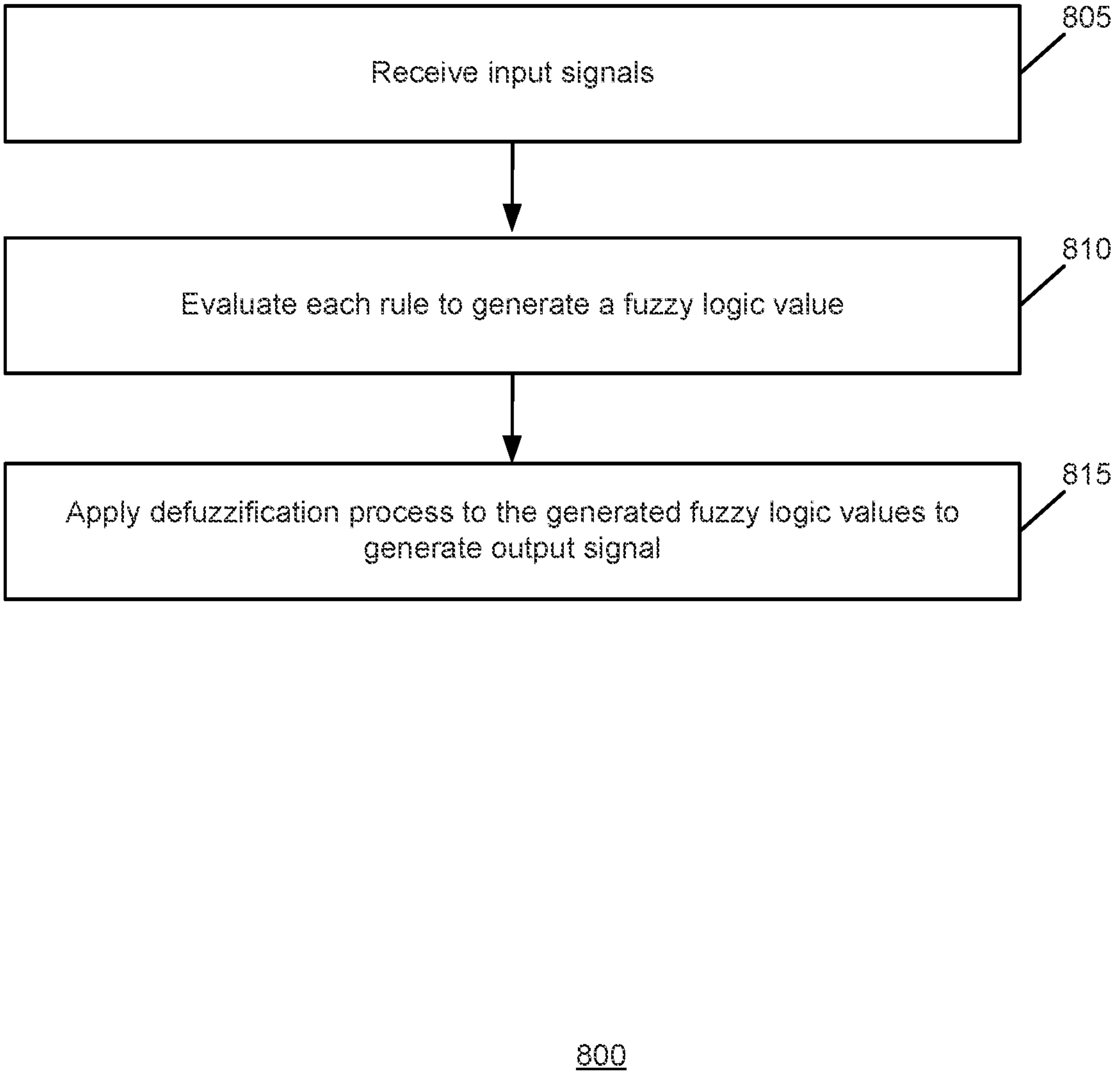
FIG. 8 is an illustration of an example method for combining fuzzy logic values from one or more rules.

FIG. 8 is an illustration of an example method 800 for combining fuzzy logic values from one or more rules. The method 800 may be implemented by one or more experts 210.

At 805, a plurality of input signals is received. The plurality of inputs may be the input signals 140 and may be received by the expert 210. The plurality of signals may be a subset of the input signals 140 or all of the input signals received by the corresponding autonomous decision system 130. The expert 210 may include a plurality of fuzzy logic rules 330.

At 810, each rule is evaluated to generate a fuzzy logic value. The rules 330 may be evaluated by the expert 210.

At 815, a defuzzification process is applied to the generated fuzzy logic values to generate an output signal. The defuzzification process may be applied by the expert and may convert all of the fuzzy logic values generated by the rules 330 into an output 315.

Figure 9:
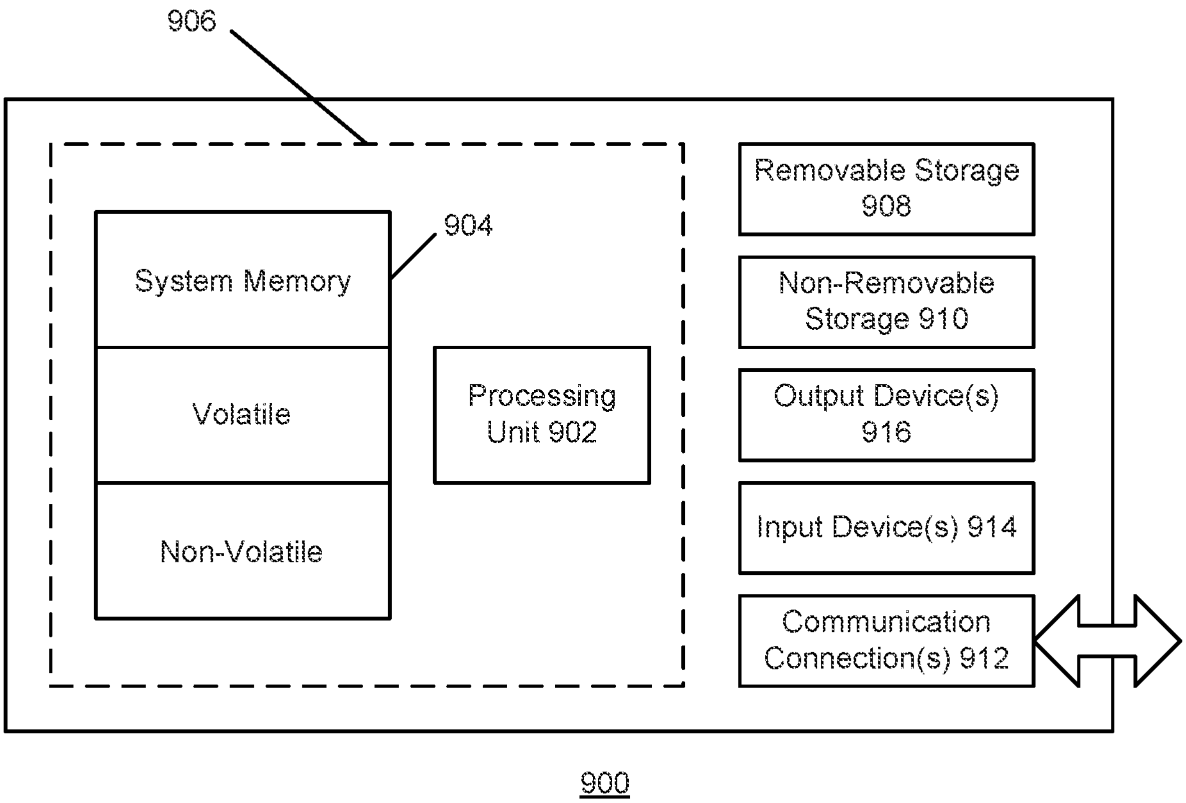
FIG. 9 shows an example computing environment in which example embodiments and aspects may be implemented.

FIG. 9 shows an example computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an example system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by the device 900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by computing device 900. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although example implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An autonomous agent comprising:

at least one computing device; and an autonomous decision system comprising:

a plurality of ensembles, wherein each ensemble is adapted to receive a plurality of input signals, and to output a control signal of a plurality of control signals, and wherein the autonomous agent is adapted to control the operation of the autonomous agent according to the plurality of control signals, and further wherein each ensemble of the plurality of ensembles comprises a plurality of experts; each expert is configured to apply fuzzy logic rules to a subset of the plurality of input signals to generate an expert output; and each ensemble of the plurality of ensembles comprises a gating network configured to combine associated expert outputs to generate the outputted control signal based on confidence values associated with the expert outputs, wherein some or all of the outputted control signal is fed back to all of the ensembles as part of the plurality of input signals with an amount of delay such that the outputted control signal fed back represents an outputted control signal generated by the ensembles in response to a previous set of input signals.

2. The autonomous agent of claim 1, wherein each signal output by an expert or ensemble of experts is associated with a confidence, and wherein the control signal output by an ensemble is based on the signals output by the plurality of experts associated with the ensemble weighted by their associated confidence.

3. The autonomous agent of claim 1, wherein each expert adapted to apply the plurality of rules to the subset of the plurality of input signals to output the signal comprises:

evaluating each rule of the plurality of rules to generate a fuzzy logic value for each rule; and applying a defuzzification process to the generated fuzzy logic values to output the signal.

4. The autonomous agent of claim 1, wherein the autonomous agent is an autonomous vehicle.

5. The autonomous agent of claim 1, further comprising a plurality of sensors, and at least some of the plurality of input signals are received from the plurality of sensors.

6. The autonomous agent of claim 1, wherein the gating network is configured to generate the outputted control signal as a weighted sum using a softmax equation that weighs each expert output based on the confidence value associated with each expert output.

7. A method for controlling an autonomous agent comprising:

receiving a plurality of input signals by the autonomous agent;

for each ensemble of a plurality of ensembles of the autonomous agent, generating a control signal by the ensemble; and controlling the operation of the autonomous agent according to the generated control signals, wherein generating the control signal by each ensemble comprises: receiving expert outputs generated by a plurality of experts that apply fuzzy logic rules to subsets of the plurality of input signals; and combining the expert outputs using a gating network based on confidence values associated with the expert outputs, wherein some or all of the generated control signal is fed back to all of the ensembles as part of the plurality of input signals with an amount of delay such that the generated control signal fed back represents a control signal generated by the ensembles in response to a previous set of input signals.

8. The method of claim 7, wherein each expert applying the plurality of rules to the subset of the input signals to generate the signal comprises:

evaluating each rule of the plurality of rules to generate a fuzzy logic value for each rule; and applying a defuzzification process to the generated fuzzy logic values to generate the signal.

9. The method of claim 7, wherein the autonomous agent is an autonomous vehicle.

10. The method of claim 7, wherein the autonomous agent comprises a plurality of sensors, and at least some of the plurality of input signals are received from the plurality of sensors.

11. The method of claim 7, wherein combining the expert outputs using the gating network comprises generating the control signal as a weighted sum using a softmax equation that weighs each expert output based on the confidence value associated with each expert output.

12. A non-transitory computer-readable medium with computer executable instructions stored thereon that when executed by a computing device of an autonomous agent cause the computing device to perform a method comprising:

receive a plurality of input signals;

for each ensemble of a plurality of ensembles of the autonomous agent, generate a control signal by the ensemble; and control the operation of the autonomous agent according to the generated control signals, wherein generating the control signal by each ensemble comprises: receiving expert outputs generated by a plurality of experts that apply fuzzy logic rules to subsets of the plurality of input signals; and combining the expert outputs using a gating network based on confidence values associated with the expert outputs, wherein some or all of the generated control signal is fed back to all of the ensembles as part of the plurality of input signals with an amount of delay such that the generated control signal fed back represents a control signal generated by the ensembles in response to a previous set of input signals.

13. The computer-readable medium of claim 12, wherein each expert applying the plurality of rules to the subset of the input signals to generate the signal comprises:

evaluating each rule of the plurality of rules to generate a fuzzy logic value for each rule; and applying a defuzzification process to the generated fuzzy logic values to generate the signal.

14. The computer-readable medium of claim 12, wherein the autonomous agent is an autonomous vehicle.

15. The autonomous agent of claim 1, wherein the gating network generates the outputted control signal by applying recursively updated weighting values to the expert outputs.

16. The computer-readable medium of claim 12, wherein combining the expert outputs using the gating network comprises generating the control signal as a weighted sum using a softmax equation that weighs each expert output based on the confidence value associated with each expert output.

* * * * *